United States Patent [19]

Shinriki

[11] 4,446,160
[45] May 1, 1984

[54] PROCESS FOR MAKING A COMPOSITE EDIBLE PRODUCT

[75] Inventor: Tatsuo Shinriki, Chiba, Japan

[73] Assignee: Height, Inc., Matsudo, Japan

[21] Appl. No.: 357,314

[22] Filed: Mar. 11, 1982

Related U.S. Application Data

[62] Division of Ser. No. 224,833, Jan. 13, 1981, Pat. No. 4,334,464.

[30] Foreign Application Priority Data

Jan. 16, 1980 [JP] Japan .................................. 55-3197

[51] Int. Cl.³ ............................................. A23P 1/00
[52] U.S. Cl. .................................. 426/297; 426/502; 426/94
[58] Field of Search .................... 426/92, 94, 138, 283, 426/297, 391, 502, 513; 99/450.6, 450.1, 450.2, 450.4, 450.7

[56] References Cited

U.S. PATENT DOCUMENTS

| | | | |
|---|---|---|---|
| 2,386,993 | 10/1945 | Valdastri | 426/283 |
| 2,969,025 | 1/1961 | Schafer | 99/450.1 |
| 3,050,017 | 8/1962 | Mahler | 426/275 |
| 3,379,139 | 4/1968 | Lipinsky | 99/450.6 |
| 3,551,161 | 12/1970 | Whitestone | 426/283 |
| 3,669,007 | 6/1972 | Pulici | 99/450.6 |
| 3,853,218 | 12/1974 | Grasvoll | 206/497 |
| 3,858,497 | 1/1975 | Ishida | 99/450.6 |
| 3,912,433 | 10/1975 | Ma | 99/450.6 |
| 3,930,440 | 1/1976 | Ohkawa | 99/450.6 |
| 3,946,656 | 3/1976 | Hai | 99/450.6 |
| 4,014,254 | 3/1977 | Ohkawa | 99/450.6 |
| 4,047,478 | 9/1977 | Trostmann et al. | 99/450.1 |
| 4,084,493 | 4/1978 | Quintana | 99/450.6 |
| 4,094,236 | 6/1978 | Holmes et al. | 99/450.4 |
| 4,114,524 | 9/1978 | Welch | 99/450.4 |
| 4,160,634 | 7/1979 | Huang | 99/450.6 |

FOREIGN PATENT DOCUMENTS 513833 12/1930 Fed. Rep. of Germany ........ 426/94
45-21620 7/1970 Japan .................................. 99/450.6

OTHER PUBLICATIONS

Modern Packaging, 9/48, pp. 157, 158.
The Cooking of China, by E. Hahn, Time Life.

Primary Examiner—Steven L. Weinstein
Attorney, Agent, or Firm—Wenderoth, Lind & Ponack

[57] ABSTRACT

A method of making up a bakery product filled with a ball of jam or similar material such as sweet bean paste or minced and cooked compound meat and greens paste. A sheet of wafer-film is stuck to a ball of the jam material. The ball and sheet are then merged with a dough skin such that a skirt portion is draped over the ball. The skirt is then puckered such that its margins are closed, whereby the ball and wafer-film stuck thereto are wrapped in the skin.

9 Claims, 9 Drawing Figures

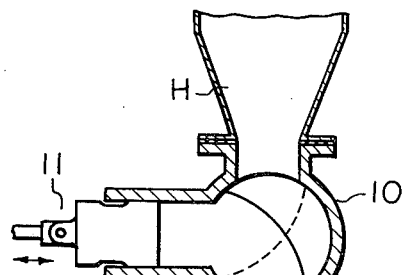
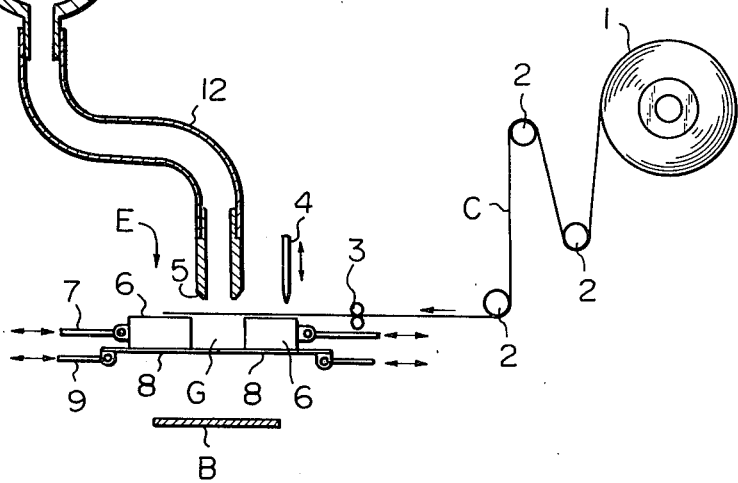
Fig. 1
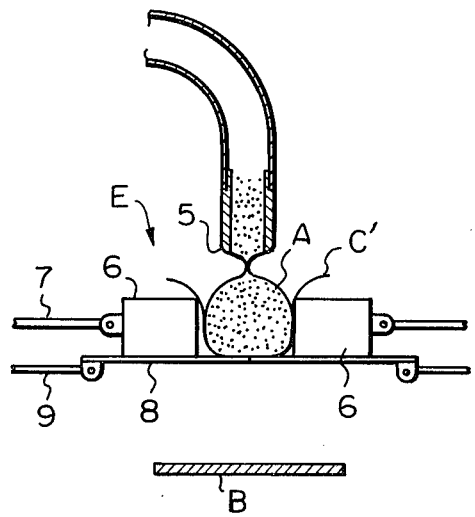
Fig. 2

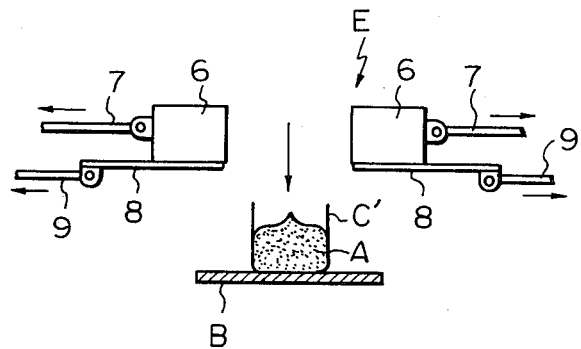
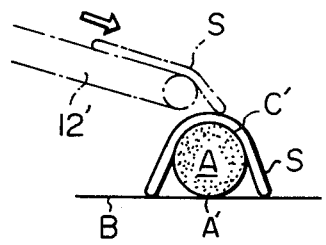
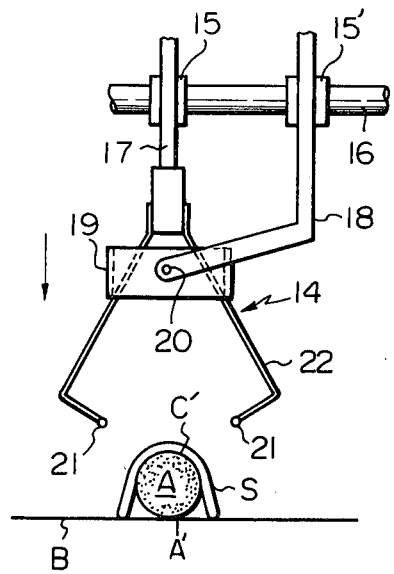

PROCESS FOR MAKING A COMPOSITE EDIBLE PRODUCT

This application is a division of application Ser. No. 224,833, filed Jan. 13, 1981, now U.S. Pat. No. 4,334,464.

BACKGROUND OF THE INVENTION

Up to the present, the process of making an encrusted jam product has been almost completely carried out by hand. Namely, in this process, an individual round dough skin (hereafter called "dough skin") is first made which is rolled by hand or machine. A jam ball i.e. a ball of sticky edible paste material, is then put on the dough skin by hand or depositing machine. The dough skin is then placed on the palm of the left or right hand, and the edge or skirt of the dough skin (hereafter called "skirt") is rerolled all around by fingers of the other hand. Finally, the dough skin together with a ball of jam or other sticky edible paste material is puckered up and around by the fingers of both hands.

Further, since the puckered part of the product has seams the product is pressed down by hand onto a pan for panning with its seam side down. After panning, the product is passed onto the next steps of proofing and baking.

As mentioned above, much of the process is performed by hand and thus a mass production operation, product make-up laborers must be employed. Furthermore, there is a problem that products made by hand have a tendency to be unstable in quality and size owing to the variation in finger skill among make-up laborers.

At the same time, instead of the above hand work, many attempts have been made on a trial basis to automate the process using machines having mechanisms for extruding and encrusting. These attempts have, however, been unsuccessful. The reason these prior attempts have been unsuccessful in the case of fermented bread dough is that, the gluten structure of the dough has a tendency to be destroyed when extruded from a narrow nozzle so that the crumb texture of products after baking becomes very weak in spite of improved recipes for dough materials or adjustments of the method of extrusion. In particular, during the first one or two days after baking, the crumb texture rapidly becomes moistureless and the products are apt to tear very easily, and yet this period just coincides with the time period that the products are put on sale. Therefore, the crumb texture is a very critical quality of the product.

In order to solve the problem mentioned above, the inventor has spent many years developing an automatic make-up machine equipped with a mechanism for performing finger-work which does not harm the bread dough and yet may be used for mass production.

SUMMARY OF THE INVENTION

The method of the invention relates to the performance of an automatic make-up machine in accordance with which plural sets of finger rods pucker products at high speed, a depositing mechanism deposits a piece of dough skin (a sheet of flattened glutinous dough) on each jam ball and a water-film feeding mechanism supplies a sheet of wafer-film (a thin flexible sheet or film of nonsticky edible material) to cover each jam ball in order to avoid the troubles which occur due to the stickiness of the jam ball. It is a main object of the present invention to automatically make up a large amount of ANPAN or similar product with long-lived and uniform sized crumbs. ANPAN is a bean paste stuffed roll well known in Japan and produced in California, Hawaii and Korea, Taiwan and South-East Asia.

It is another object of the present invention to reduce the required number of make-up laborers and to be able to operate the machine with a single operator.

BRIEF DESCRIPTION OF THE DRAWINGS

The structure, operation and effects of the present invention will become more apparent from the accompanying drawings in which FIG. 1 is a partially cross-sectional side vertical view of a principal part of a depositor which may be used in performance of the invention;

FIG. 2 is a partially cross-sectional side vertical view of the nozzle part shown in FIG. 1;

FIG. 3 is a partially cross-sectional side view of the opening position of a jam ball holding mechanism which may be used in performance of the invention;

FIG. 4 is a side view of a jam ball covered with a dough skin S at the primary encrusting stage;

FIGS. 5a, 5b and 5c are side views of the mechanical sequence of the secondary stage of encrusting a jam ball with a dough skin in accordance with the invention.

DETAILED DESCRIPTION OF THE PREFERRED EMBODIMENT

Figure 5B:
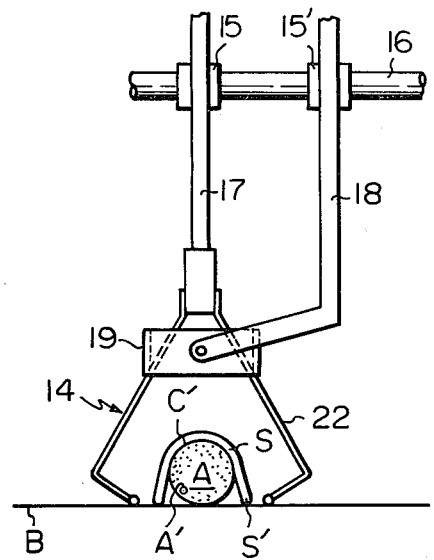

In FIG. 1, the jam stocked in the hopper H is pushed out by a stroke of ram 11 after being scaled to the desired size in the cylinder type valve 10 and comes out as a jam ball from the nozzle 5 through the hose 12 at regular intervals. A jam ball A shown in FIG. 2 is deposited from the nozzle 5 on a sheet of wafer-film C' which completely covers the bottom surface of jam ball A.

The wafer-film roll 1 unwinds and supplies its tape C to the beds 6 of the primary mechanism E suitable for covering a ball of paste such as jam A. As soon as the tape is set on the beds 6 by the driving rollers 3 which drive tape C through the guide rollers 2, it is cut to a suitable length as a sheet of wafer-film C' by the cutter 4.

The conveyer B travels to the right direction as viewed in FIG. 1.

When a jam ball is put on a sheet of wafer-film C' stretched across both beds 6, the jam ball A and wafer-film C' are held by both beds 6 and the wafer-film sheet C' is further stretched onto the baffle plate 8 which is in the closed position shown in FIG. 2.

The beds 6 and baffle plate 8 are relatively opened and closed by the rods 7 and 9 in the direction indicated by the arrows shown in FIG. 1.

FIG. 3 is a view showing a jam ball A primitively covered with a sheet of wafer-film C' dropped by the opening stroke of the parts 6 and 8 onto the conveyor B. This jam ball A travels to the right in FIG. 3. In this way, a sheet of wafer-film C' not only protects the conveyor surface B from direct contact with the jam ball A, but also lets the jam ball A keep its own form stable for a short period of time.

In consequence of the travel of the conveyer B, jam ball A' formed from jam ball A and wafer-film sheet C' is conveyed beneath a conveyor 12' which shifts a dough skin S over jam ball A' as shown in FIG. 4. The timing of the arrival of the jam ball A' on the conveyor B is syncronized with the arrival of the dough skin S, so that the dough skin drops on the jam ball A'.

A jam ball A' is covered with a dough skin S as shown in FIG. 4 is conveyed to the position of a first finger rods encrusting mechanism 14. The sequence of operation of finger rods crusting mechanism 14 is shown in FIGS. 5a to 5c.

Figure 5C:
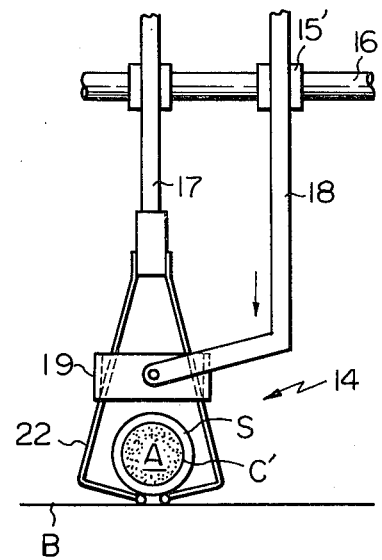
Figure 6A:
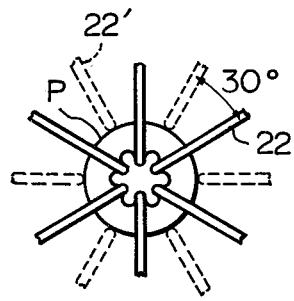
FIGS. 6a and 6b are cross-sectional views of the closing position of the finger rods which may be used at the secondary encrusting stage of the invention.
Figure 6B:
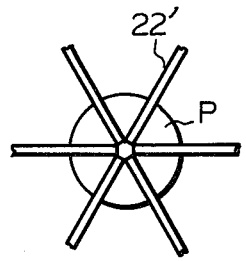

Finger rods encrusting mechanism 14 includes a reciprocable rod 17 and elbow-type armrod 18 respectively built for vertical movement in guide bearings 15 and 15' which are supported in support 16, a guide ring 19 connected to armrod 18 with a pin 20 located directly under the rod 17 and plural finger rods 22 (for example six, as illustrated in FIGS. 6a and 6b, only two being shown in FIGS. 5a–5c), which are elastically connected to the lower end of the rod 17 and can open and close freely in radial directions by the operation of the guide ring 19.

Each tip of the finger rods 22 has a Teflon globular part 21 which is suitable for handling dough skin and a sticky jam ball (including the covering sheet of wafer-film).

The finger rods make a closing motion when the rod 17 and armrod 18 go down to a fixed height and then the armrod 18 alone continues further down together with the guide ring 22 (shown in FIG. 5c).

In this motion, the skirt S' of dough skin S is pushed and puckered by the finger rods 22. However, as shown in FIG. 6a, the skirt S' after only one closing motion of the finger rods 22 is not perfectly puckered and is shaped to be petaline. Therefore, it is desirable that another six finger rods 22' which are rotated 30° about their axis of symmetry relative to the first group of finger rods 22 are provided to perfectly repucker the petaline dough skin. FIG. 6b shows the bottom surface P of dough skin puckered perfectly.

In the closing motion of the finger rods 22, as the bottom surface of the jam ball A' encrusted with dough skin S is covered with a sheet of wafer-film C' before dough skin S is applied, the jam ball A', especially the part covered by wafer-film sheet C', is very smooth and therefore acceptable to being encrusted with the skirt S' without irregular shape or distortion, as shown in FIG. 5b.

Furthermore, the dough skin S, except its skirt S', does not undergo any pressure by the tips of finger rods when being puckered so that the gluten structure of the dough also is maintained in ideal condition for a long period of time.

Therefore, in accordance with this invention it is possible to automatically make up dough products having fine gluten structure which hold moisture and gas cells in uniformity so that these products may be kept fresh for long periods of time and have a good flavor after baking.

What is claimed is:

1. A process of covering a ball of sticky edible paste material to form an edible product, comprising the steps of:
    (1) depositing the ball onto a film of thin, flexible edible material and at least partially folding the film so as to partially encompass the ball sufficiently to help retain the shape of the ball and prevent the ball from undesirably sticking to other surfaces during said process;
    (2) merging the ball and the film with a sheet of flattened glutinous dough by depositing the dough sheet on the ball and film so as to cover the ball and film, such that the dough sheet includes a skirt portion draped over the ball; and
    (3) gathering the skirt of the dough sheet underneath the ball such that the margins of the skirt are brought together in contact with the film and the ball and film are enclosed without distorting the ball.

2. A process as in claim 1, further comprising the step of depositing said ball and said film onto a conveyor.

3. A process as in claim 2, further comprising the step of conveying said ball and said film on said conveyor to a first location beneath a rolled dough sheet supply device, said step of merging comprising the step of conveying and depositing said dough sheet onto said ball at said first location.

4. A process as in claim 3, wherein said step of gathering the skirt of said dough sheet comprises the step of conveying said ball, said film and said dough sheet deposited on said ball on said conveyor to a second location; and gathering the skirt of the dough sheet with a clamping mechanism at said second location.

5. A process as in claim 4, wherein said step of gathering includes the step of clamping said skirt with a plurality of flexible finger rods.

6. A process as in claim 4 or 5, wherein said film is deposited between said conveyor and said ball when said ball and said film are deposited on said conveyor and said step of gathering includes the step of clamping said skirt beneath said film.

7. A process as in claim 2, wherein said step of depositing comprises the step of holding said ball and said film on a primary covering mechanism above said conveyor.

8. A process as in claim 7, wherein said primary covering mechanism includes separable baffle plates for supporting said ball and said film, said step of depositing said ball and said film onto said conveyor comprising the step of separating said baffle plates.

9. A process as in claim 1, wherein said step of depositing comprises the step of unwinding a roll of the film and cutting a piece of film from said roll beneath said ball.

* * * * *